No. 775,816. PATENTED NOV. 22, 1904.
C. L. GOEHRING & W. TROCHE.
GLASS GRINDING MACHINE.
APPLICATION FILED FEB. 13, 1904.
NO MODEL. 10 SHEETS—SHEET 1.

No. 775,816. PATENTED NOV. 22, 1904.
C. L. GOEHRING & W. TROCHE.
GLASS GRINDING MACHINE.
APPLICATION FILED FEB. 13, 1904.
NO MODEL. 10 SHEETS—SHEET 7.

No. 775,816. PATENTED NOV. 22, 1904.
C. L. GOEHRING & W. TROCHE.
GLASS GRINDING MACHINE.
APPLICATION FILED FEB. 13, 1904.
NO MODEL. 10 SHEETS—SHEET 8.

No. 775,816. PATENTED NOV. 22, 1904.
C. L. GOEHRING & W. TROCHE.
GLASS GRINDING MACHINE.
APPLICATION FILED FEB. 13, 1904.
NO MODEL. 10 SHEETS—SHEET 9.

No. 775,816.                                                                                           Patented November 22, 1904.

UNITED STATES PATENT OFFICE.

CHARLES LEWIS GOEHRING AND WILLIAM TROCHE, OF AKRON, OHIO; SAID TROCHE ASSIGNOR TO SAID GOEHRING.

GLASS-GRINDING MACHINE.

SPECIFICATION forming part of Letters Patent No. 775,816, dated November 22, 1904.

Application filed February 13, 1904. Serial No. 193,440. (No model.)

*To all whom it may concern:*

Be it known that we, CHARLES LEWIS GOEHRING and WILLIAM TROCHE, of Akron, in the county of Summit, State of Ohio, have invented certain new and useful Improvements in Glass-Grinding Machines; and we do hereby declare the following to be a full, clear, and exact description of the same, reference being had to the accompanying drawings, forming a part of this specification, and to the letters of reference marked thereon.

This invention relates to improvements in glass-grinding machinery, features of the invention being applicable generally to machines for grinding glass plates, although the machine adopted for illustrating such features in connection with other features is primarily adapted for the grinding of bevels on plates of glass. In the use of the term "grinding" it will be understood that the invention contemplates not only the grinding away of the surface to the desired plane, but also the finishing and polishing of such surface where the latter steps are deemed necessary or desirable.

The invention consists primarily in a grinding-machine embodying a plane-grinding surface as contradistinguished from a grinding-roller, such surface being given a movement in which every portion coöperating with the glass will have an equal movement—that is to say, all portions of the glass surface in contact with the grinder are subjected to an equal degree of friction or abrasive action.

The invention further consists in a machine embodying a grinder in the form of a plane surface, all portions of which are given coextensive circulatory movement with relation to the face of the glass being acted upon, and, further, in a machine wherein the glass is clamped and held by supporting means movable bodily about an axis for presentation to the grinder, with means for adjusting the angle of the glass in said supporting and holding means in order to vary the depth and width of the bevel being formed.

The invention further consists in certain novel details of construction and combinations and arrangements of parts, all as will be now described, and the particular features of novelty pointed out in the appended claims.

In the accompanying drawings, Fig. 1ᵃ is a diagrammatic detail showing the location of the axis substantially coincident with the edge of the glass. Fig. 8 is a top plan, and Fig. 9 an end elevation, of the mechanism shown in Fig. 7. Fig. 10 is a top plan, Fig. 11 a rear elevation, and Fig. 12 an end elevation, of still a different mechanism for supporting and driving the grinder. Fig. 13 is a top plan, and Fig. 14 an end elevation, of a modified form of grinder particularly adapted for performing that step in the grinding operation commonly known as "white-wheeling," but which in the present machine is performed by a grinder having a surface of rawhide or equivalent material.

Like letters of reference in the several figures indicate the same parts.

Referring particularly to Figs. 1 to 5, the main or stationary portion of the frame of the machine is shown as formed by side pieces A, suitably connected by cross-pieces B, so as to constitute a rigid structure in which the grinding and glass-holding mechanisms may be mounted.

Generally speaking, the grinder is in the form of a substantially horizontal bar or grinding-table C, which is adapted to receive a bodily circulatory movement in the plane of or parallel with the plane of its grinding-surface, the mechanism for supporting and driving said table being such that it will be maintained in a single plane throughout all of its movements, as will be hereinafter more particularly described.

As illustrated in the before-mentioned figures of the drawings, said grinding-table is clamped in a frame C' by clamps c, (in dotted lines, Figs. 1 and 2,) and said frame C' constitutes both the body of the grinder and bottom of a receiver for the abrasive material—sand, emery, pumice-stone, rouge, &c.—which may be discharged from the surface of the grinding-table C or which may be thrown from said receptacle onto the grinding-surface by the movements of the frame C'. The walls of the receptacle are preferably extended upwardly, as at $C^2$, on the sides and back of the grinding-table, and a suitable supply-receptacle $C^3$ is provided for supplying the necessary quantity of abrasive material. Said receptacle $C^3$ is usually attached to or formed as a portion of the movable mechanism in order to automatically feed the abrasive when the grinding-table is in motion. From the receptacle formed by the frame C' the abrasive material may work off over the front of the grinding-table and edge of the receptacle into a fixed receiver $C^4$, (dotted lines, Figs. 1 and 2,) from whence it may be discharged through a spout $c^4$, Figs. 1 and 4.

As before stated, in the particular embodiment illustrated in these figures of the drawings the glass is clamped and held by mechanism which is bodily movable about an axis, such bodily movement serving to bring the glass into contact with the grinding-table, the mechanism for accomplishing this consisting primarily of a pivoted frame formed by side pieces D, mounted on a shaft D' and connected rigidly at the front of the machine by a cross-piece $D^2$. The shaft D' is mounted in vertically-adjustable bearings E, the mechanism for adjusting said bearings preferably consisting of elevating-screws E', journaled in the side pieces A of the main frame and adapted to be rotated in unison by bevel-gears $E^2$ and a cross-shaft $E^3$, to one end of which a crank-handle $E^4$ or other suitable appliances may be connected for manual manipulation.

The entire glass clamping and controlling mechanism is carried by the frame formed by the side pieces D, shaft D', and cross-piece $D^2$.

In order to permit of the angular adjustment of the glass, so as to vary the width of the bevel and to permit of the adjustment being regulated by suitable graduated gages, the glass holding and clamping mechanism is made adjustable on the frame D about an axis substantially coincident with the edge of the glass plate to be ground, (see Fig. 1ª,) and in order to permit of this result being accomplished the side pieces D are provided with rearwardly-extending arms d, in the ends of which the forwardly-extending arms F' of the table F are journaled. The table F constitutes the direct support for the glass plate, which latter is indicated at G lying on a pad G' on the table. The forward end of the table F is adjustably supported from the cross-bar $D^2$ by a centrally-arranged adjusting-screw $F^2$, having a hand-wheel $F^3$ and preferably cooperating with said table F through a spherical or ball joint $F^4$ in order to permit of the angular adjustment of the said table about the axis at the rear ends of the arms F' and d. The surface of the table and pad G' is so formed that the glass lying upon the same may project with its forward edge coincident with the axis of the table F, as will be readily understood from an inspection of Figs. 1, 1ª, and 2 of the drawings, and means are provided to facilitate the adjustment of the glass with its edge in the position referred to, such means preferably consisting of gage-arms $G^7$, mounted on a shaft $G^8$, journaled in an overhanging frame $G^2$, carried by an arch $G^3$, supported by the table F, as best seen in Fig. 3. The shaft $G^8$ may be rotated and held with the arms $G^7$ elevated by a hand-bar H, having a notch h therein for engagement with one of the guides in which the bar works. The arms and shaft are preferably moved in the opposite direction by a spring H', one end of which is connected with the shaft or one of the arms thereon and the other end of which is connected with a ratchet-wheel $H^2$, journaled on the shaft and held against reverse rotation by a pawl $H^3$, thereby providing a means for readily adjusting the tension of the spring H'. In order to arrest the downward movement of the arms $G^7$, the shaft $G^8$ is provided with a stop-arm $G^4$, (see dotted lines, Fig. 1,) adapted to contact with an adjustable stop or set-screw $G^5$, as will be readily understood.

The arch $G^3$, mounted on the table F, in addition to carrying the arms for positioning the forward edge of the glass also carries the clamping mechanism for pressing the glass down against the bed and holding the same rigidly during its presentation to the grinder. This clamping mechanism is of such character that it will automatically adjust itself both to the angle of the glass and to any irregularities in the thickness of the glass, and it will be understood, of course, that the glass is presented to the grinder face downwardly, the clamps thus being brought to bear against the rear face of the glass, and as a consequence said glass is positioned accurately with respect to its front face. The clamping mechanism is also preferably of such a character that more than a single plate of glass may be clamped and held at the same time, and one of said plates may be of greater or less thickness than the other. In order to secure this universal adaptability, as well as to permit of the ready movement of the clamping mechanism, so as to clamp the glass plates more or less tightly, the arch $G^3$ is provided with a central way or guide for a clamp-support or slide I, preferably a rack-slide, with which a pinion K on a cross-shaft K' meshes. Said shaft K' is provided at its end with a worm-gear $K^2$, with which a worm $K^3$ on the shaft $K^4$ meshes. The shaft $K^4$ is in turn provided with a hand-wheel, by means of which the slide I may be raised and lowered. At its lower end the slide I is jointed centrally to an evener L, preferably in the form of an equal arm-lever, which at its two ends carries by pivotal connections the clamps M M. The clamps M M are primarily pivoted on axes at right angles to the axis of the evener L, and a sufficient looseness is left between the clamps M and evener to permit said clamps to have practically a slight universal movement in any direction. This is most easily accomplished by forming the holes through which the pivot-bolts $m$ pass slightly larger than said bolts and forming the ends of the evener with a curved bearing-surface $m'$, adapted to bear upon the upper side of the clamps when the clamps are forced down against the glass lying on the table or bed.

Figure 5:
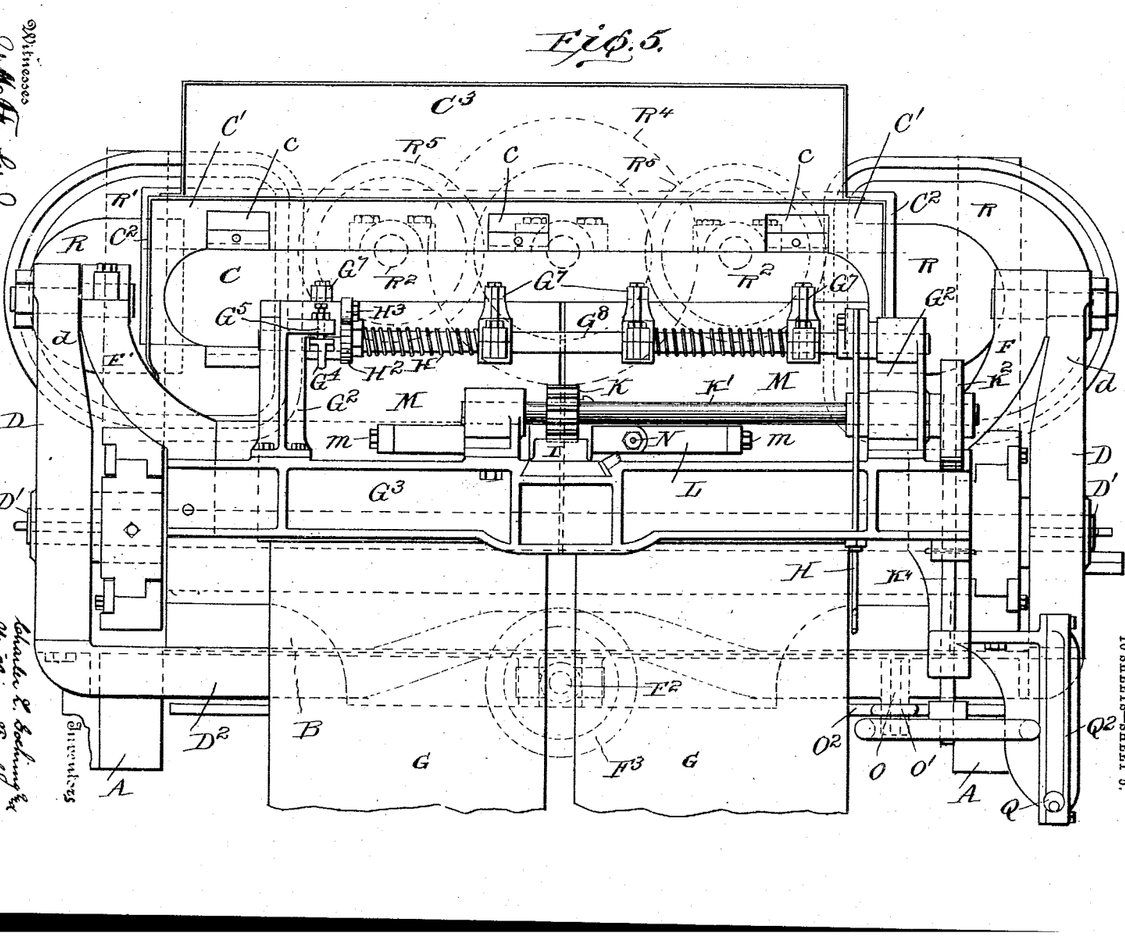

To prevent too great pivotal movement of the clamps and evener or to limit such pivotal movements, adjustable stop-screws N may be mounted on the slide I for coöperation with the evener and adjustable stop-screws N' may be mounted on the evener for coöperation with the clamps, said adjustable stop-screws being located a suitable distance transversely of the axes to form effectual stops; but at the same time sufficient play is allowed for the clamps to accommodate themselves accurately to the surface of the rear face of the glass. In Figs. 3 and 5 the clamps are shown as coöperating with separate plates of glass G; but it will be understood that they may both coöperate with a single large plate or, if so desired, one of the clamps may be used to clamp a small plate, while the other clamp obtains its bearing against the bed or table, whereby the pressure will be equalized in the machine.

Figure 1:
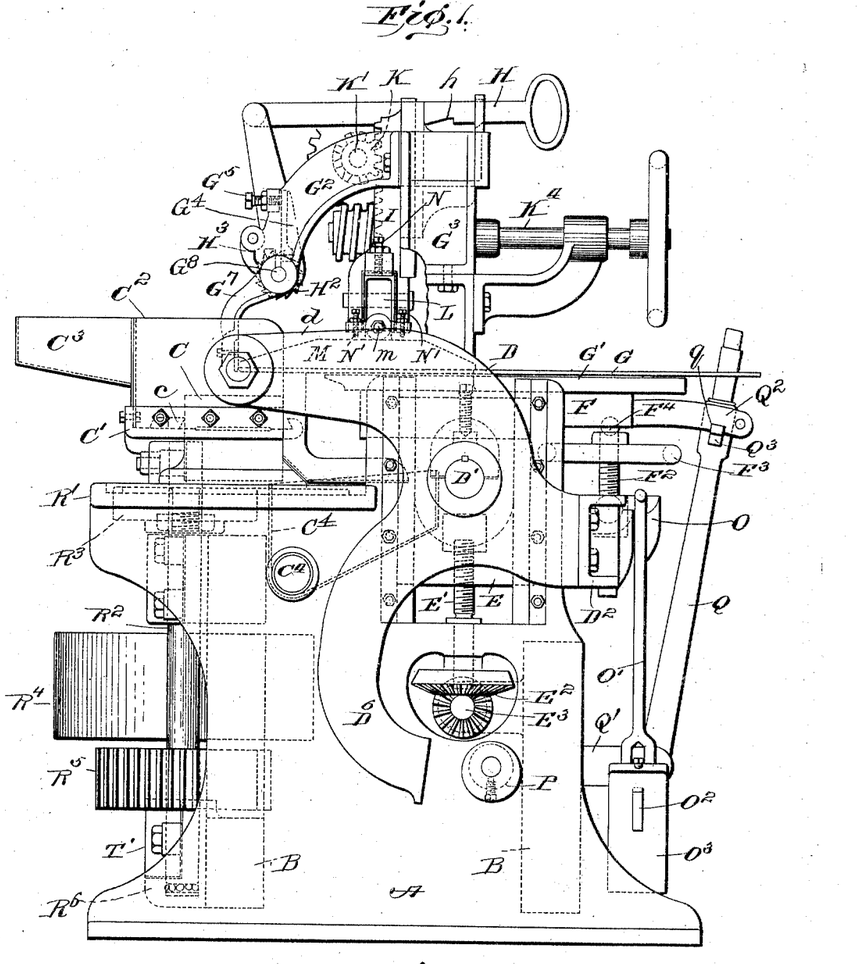
Figure 1 is a side elevation looking at the left-hand side of the machine embodying the present improvements.
Figure 1A:
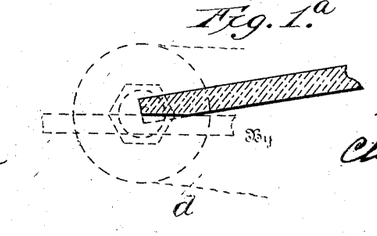
Figure 2:
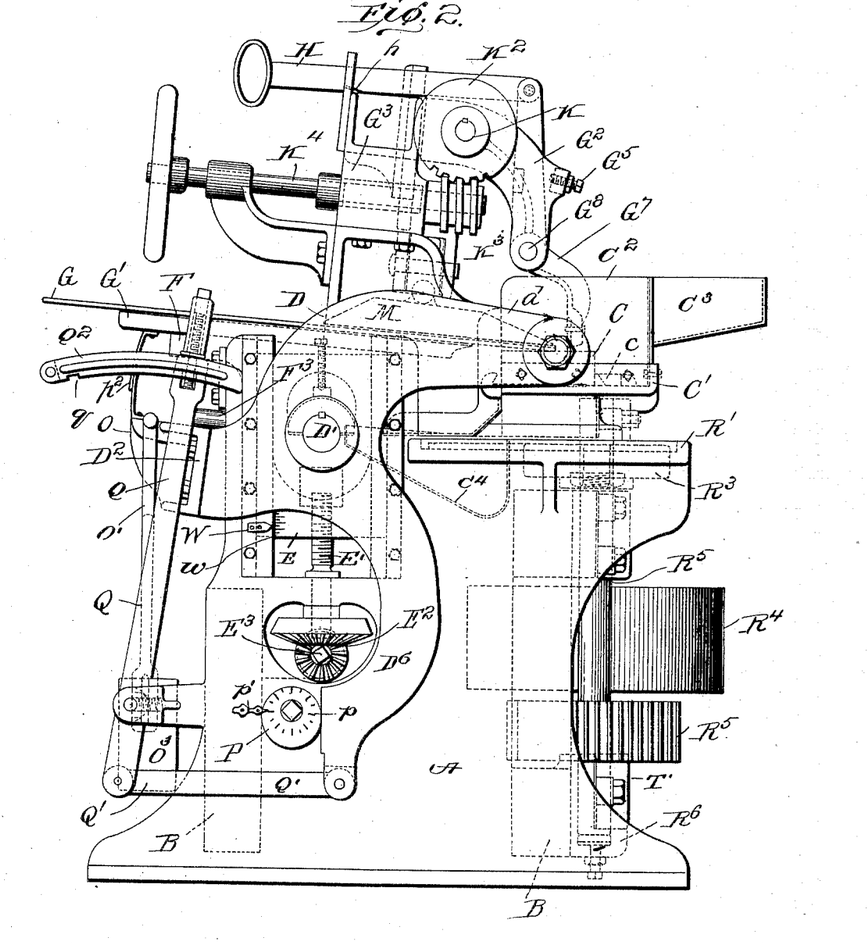
Fig. 2 is a similar view looking at the right-hand side of the machine.
Figure 3:
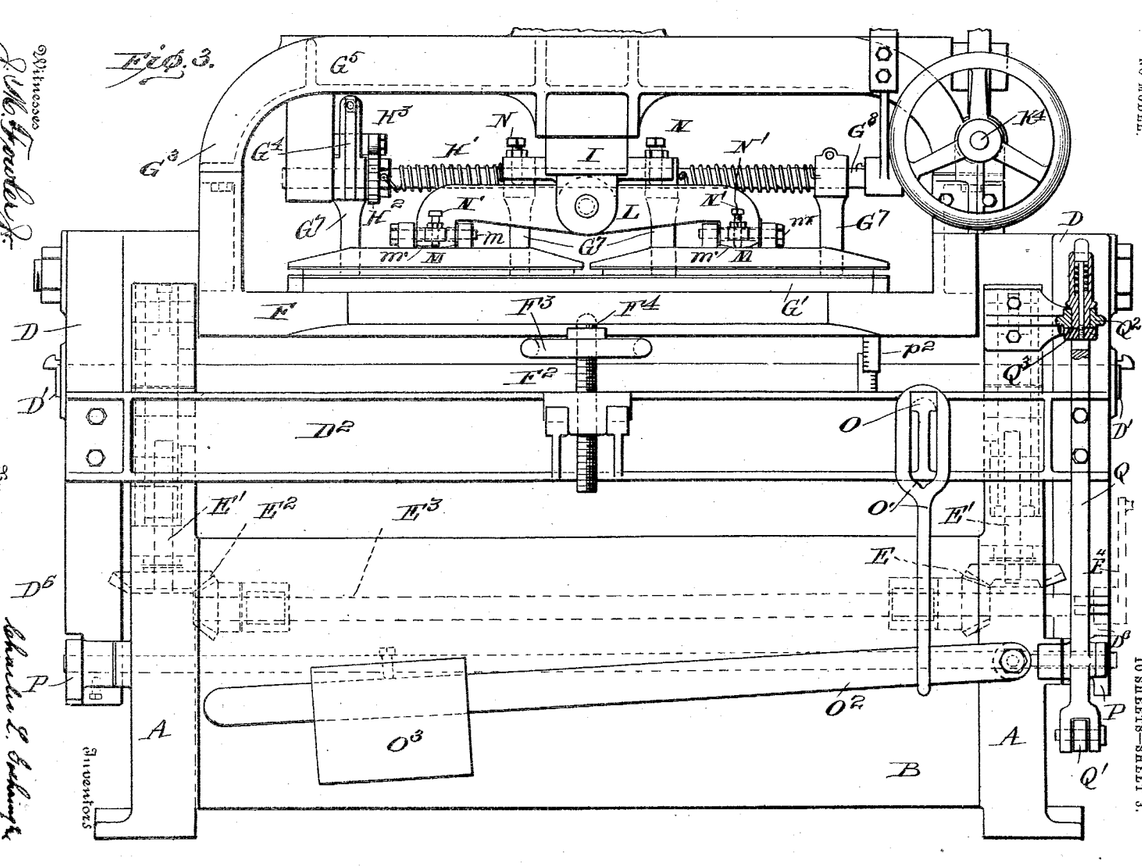
Fig. 3 is a front elevation, Fig. 4 a rear elevation, Fig. 5 a top plan view, of the same machine.

The weight of the glass-holding and clamping mechanism, it will be seen from Figs. 1 and 2, is in rear of the axis of the carrying-frame D, and hence will tend to turn said frame, so as to bring the rear edge of the glass down against the grinder. The weight of these parts is ordinarily depended upon to give the desired pressure; but inasmuch as the parts are necessarily heavy in order to secure strength and rigidity it is found in some instances desirable to provide a counterbalancing mechanism for relieving the glass of some pressure, and as a convenient means for accomplishing this end the cross-bar $D^2$ is provided with a projection O, over which a link O' is hung, said link extending downwardly and coöperating with a counterbalance-lever $O^2$, pivoted at one end on the main frame and carrying an adjustable weight $O^3$, which may be moved on the lever, so as to counterbalance any desired proportion of the weight of the glass clamping and holding mechanism, and thereby regulate the pressure between the glass and grinder.

To regulate the depth of the bevel, the pivotal movement of the frame D and parts mounted thereon is controlled by a stop mechanism, such mechanism preferably consisting of a pair of cams P, mounted on a cross-shaft in the main frame, so as to be angularly adjustable. Stop-arms $D^6$ on the frame D are adapted to coöperate with the cams, the engaging surfaces of said stop-arms $D^6$ being radial to the shaft D', and as a consequence the vertical adjustment of the shaft D' and frame will not affect the angular position at which the frame is arrested by contact with the cams P.

The described means for arresting the pivotal movement of the frame D in connection with the pivoting of the glass table or bed with its axis in line with the edge to be beveled is important, inasmuch as by this means suitable gages may be provided for indicating the angular position of the table on the frame and the angular position at which the frame is arrested, which gages may be correlated so as to enable the workmen to properly set them for forming bevels of the desired depth and width without the necessity of experimentation. This will be best understood when it is explained that the shaft D' and frame D are made vertically adjustable primarily to adapt the machine for use with grinders of greater or less thickness, or the surface of which may become worn, whereas the other adjustments—namely, the angular position of the frame and the angular position of the bed on the frame—are intended to be utilized in regulating the depth and width of bevel. Thus by adjusting the cams P the depth of the bevel may be regulated with the greatest accuracy and with a given depth of bevel. By adjusting the angular position of the bed F on the frame D the width of bevel may be accurately regulated. One or both of the cams P may be provided with a graduated scale $p$, with which a pointer $p'$ will register, and the bed F and cross-bar $D^2$ may be provided with registering graduated gages $p^2$, Figs. 2 and 3, and said gages will always bear a certain definite correlation for a given depth and width of bevel. A workman may thus set said gages and know that the machine will properly handle the glass, which may have been previously roughed out, with a bevel of certain depth and width, and said gages may be quickly adjusted for other plates having a bevel of different depth and width, which result could not be accomplished were the table F pivoted on an axis other than substantially coincident with the edge of the glass.

Figure 4:
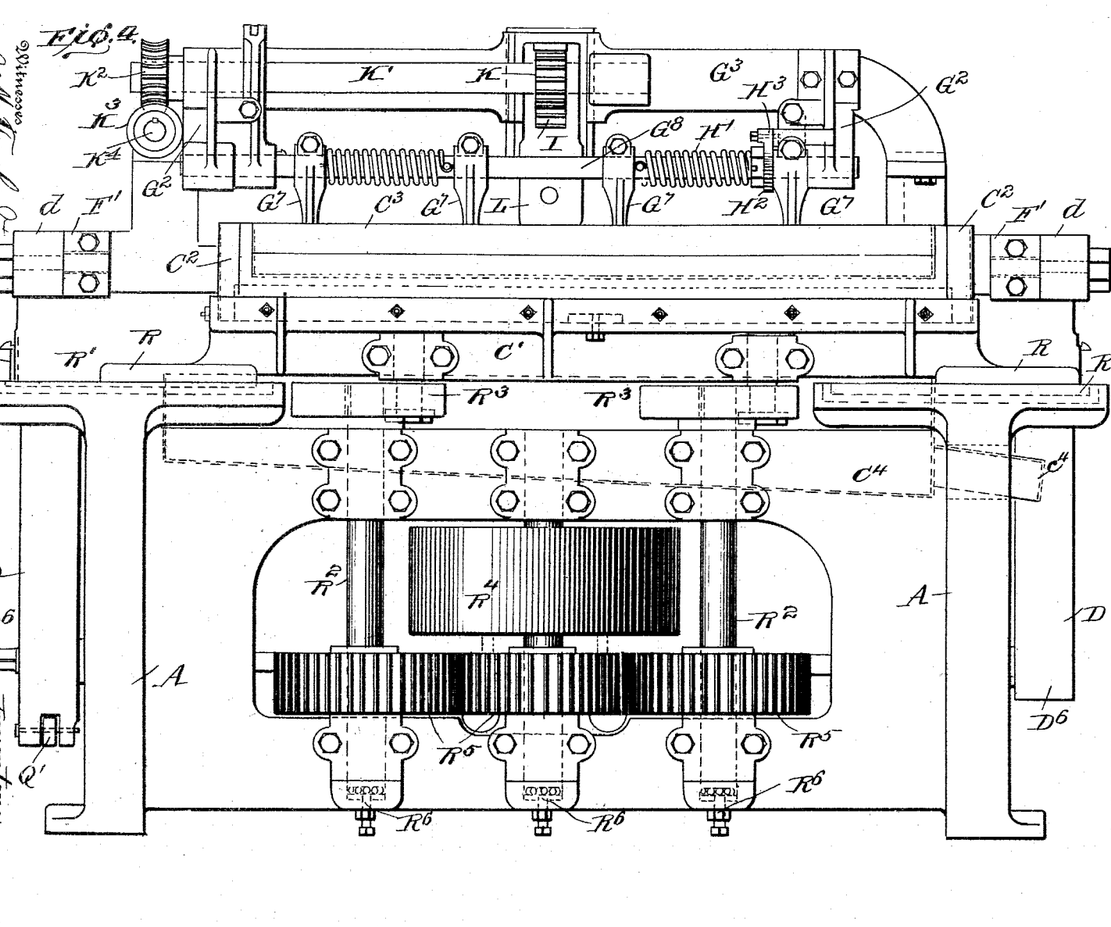

In order that the attendant may be able to control the position of the glass so as to raise or lower the same—for instance, to move it from the position shown in Fig. 2 to that shown in Fig. 1—a control-lever Q is pivoted at one side of the main frame in convenient position to be grasped by the attendant, and the lower end of this lever is connected by a link Q' with the lower end of one of the arms $D^6$. A quadrant $Q^2$ attached to the frame is provided for guiding the upper end of the lever Q, and a spring-pressed pawl or lock $Q^3$ on the lever is adapted to coöperate with a notch $q$ in the quadrant for holding the parts with the glass elevated or in horizontal position, as shown in Fig. 1. By releasing the lock the attendant may lower the rear edge of the glass down onto the grinder, where it will be held by the weight of the parts, as before explained. Where a grinder having a plane surface is employed for dressing the face of the glass, it is of the greatest importance that every portion of said surface should have a movement coextensive with every other portion in order that the glass may be given a true surface and one portion not ground away to a greater extent than any other portion. It is also of great importance to maintain the grinder in a plane true with the surface being formed at all positions of its movement—in other words, to prevent any tilting or inclining of the grinder under the pressure of the glass being operated upon or due to other forces which may tend to distort the grinder or to change the plane of the surface of the same. A number of mechanisms have been designed for accomplishing these ends, in all of which the grinder is given a bodily circulatory movement parallel with the plane of its grinding-face, and in Figs. 1 to 5 of the accompanying drawings one simple form of mechanism is illustrated. In these figures the frame or grinder support C' is provided at each end with extended bearings R, having flat bottom faces in coincident or parallel planes and adapted to rest on extended plane bearing-surfaces R', formed on the main frame of the machine. The faces R' are preferably provided with rims to retain a lubricating substance and are of sufficient surface area to permit the bearings R to travel in their circulatory movements coincident with the movement of the grinder itself. For driving the grinder or imparting the circulatory movement thereto vertical shafts $R^2$ are journaled in the main frame and provided at their upper ends with crank-pins $R^3$, which coöperate or connect with the under side of the frame C'. These shafts $R^2$ are given simultaneous rotation, preferably from a drive-shaft and pulley $R^4$ and gearing $R^5$, as best seen in Fig. 4 of the drawings. In this particular embodiment of the driving mechanism the shafts $R^2$ do not necessarily support the grinder; but it may nevertheless be found convenient to provide said shafts with adjustable thrust-bearings $R^5$ at their lower ends for taking up wear and providing an efficient means for preventing excessive friction.

Figure 6:
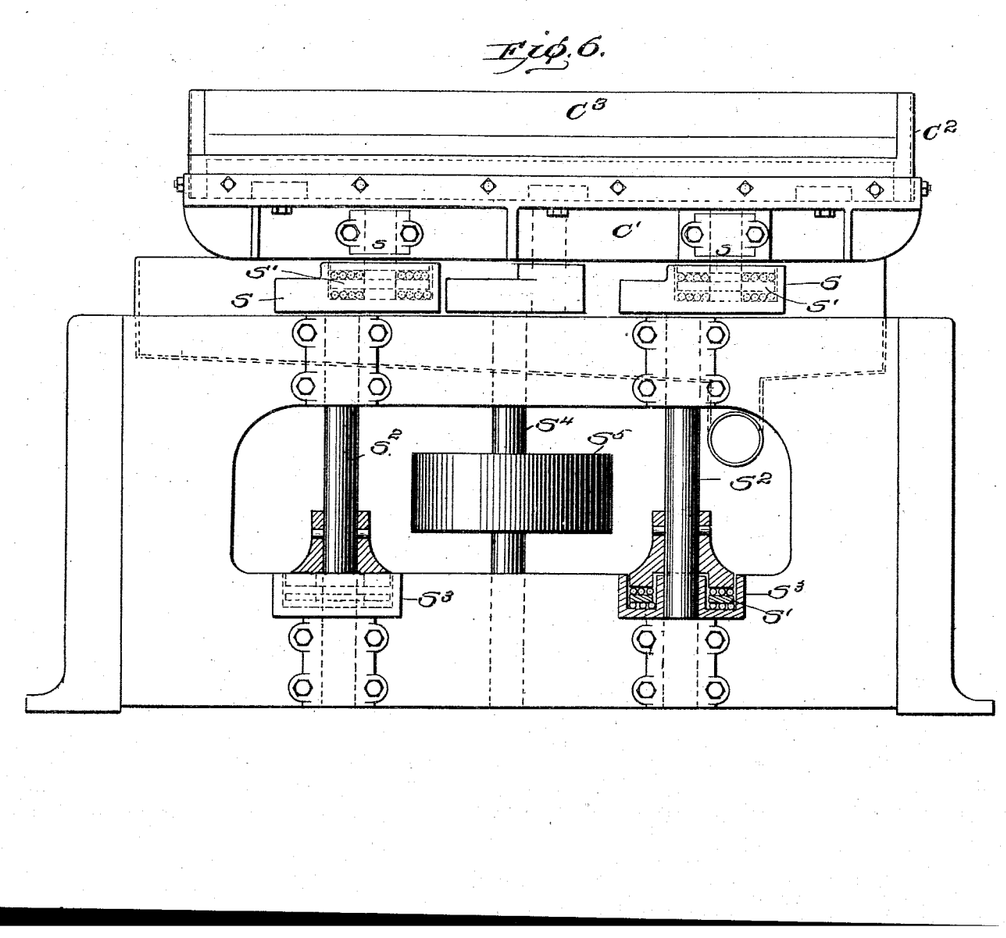
Fig. 6 is a rear elevation of the grinder with the preferred means for supporting and driving the same.

In Figs. 6 to 12 of the accompanying drawings various arrangements of the driving and carrying mechanism for the grinder are illustrated. Fig. 6 shows the preferred arrangement, and in this figure it will be seen that the grinder-frame C' is provided with journals $s$, which are supported in crank-bearings S on the upper ends of shafts $S^2$, said shafts at their lower ends being stepped in bearings $S^3$. The crank-bearings S, as well as the step-bearings $S^3$, are preferably in the form of relatively large ball-bearings, with the balls arranged in parallel planes and separated by intermediate loose disks S', said balls serving to support the frame C' and constitute, in effect, thrust-bearings; but the motion is distributed between the balls arranged in the different planes, each set of balls moving only its proportionate portion of the travel of the parts. By forming the bearings enlarged transversely of the axis, as illustrated, the surface of the grinder will be maintained in its horizontal parallelism throughout its entire motion, which motion corresponds to the angular displacement or rotation of the crank.

The two shafts $S^2$ are idle shafts in that they are preferably not connected with the driving mechanism, and an additional crank-shaft $S^4$ is provided with a pulley $S^5$ for imparting motion to the grinder-frame C', the crank of said shaft $S^4$ being preferably connected with the said frame intermediate the two bearings $s$. Thus in accordance with the well-understood principle of mechanics by the rotation of the crank-shaft $S^4$ a corresponding bodily rotation will be imparted to the grinder, which will be maintained in its parallelism by the three cranks arranged in alinement with each other.

Figure 7:
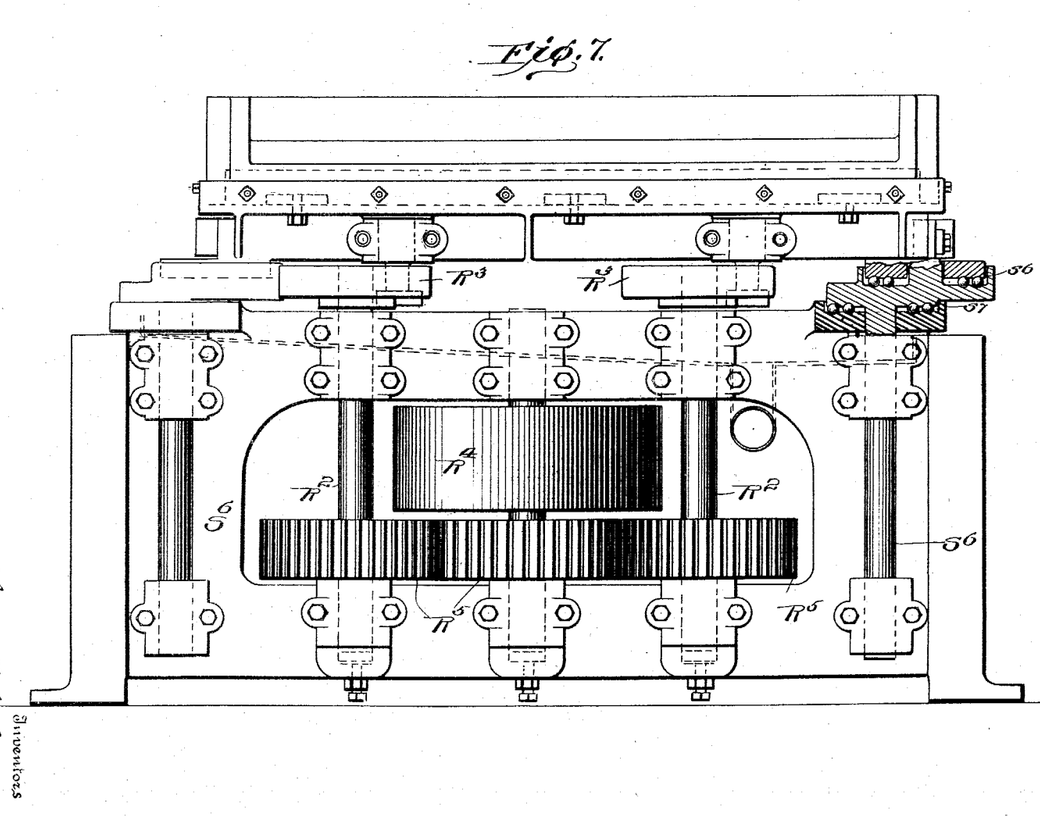
Fig. 7 is a view corresponding to Fig. 6, showing a different means for supporting and driving the grinder.
Figures 8, 13, 14:
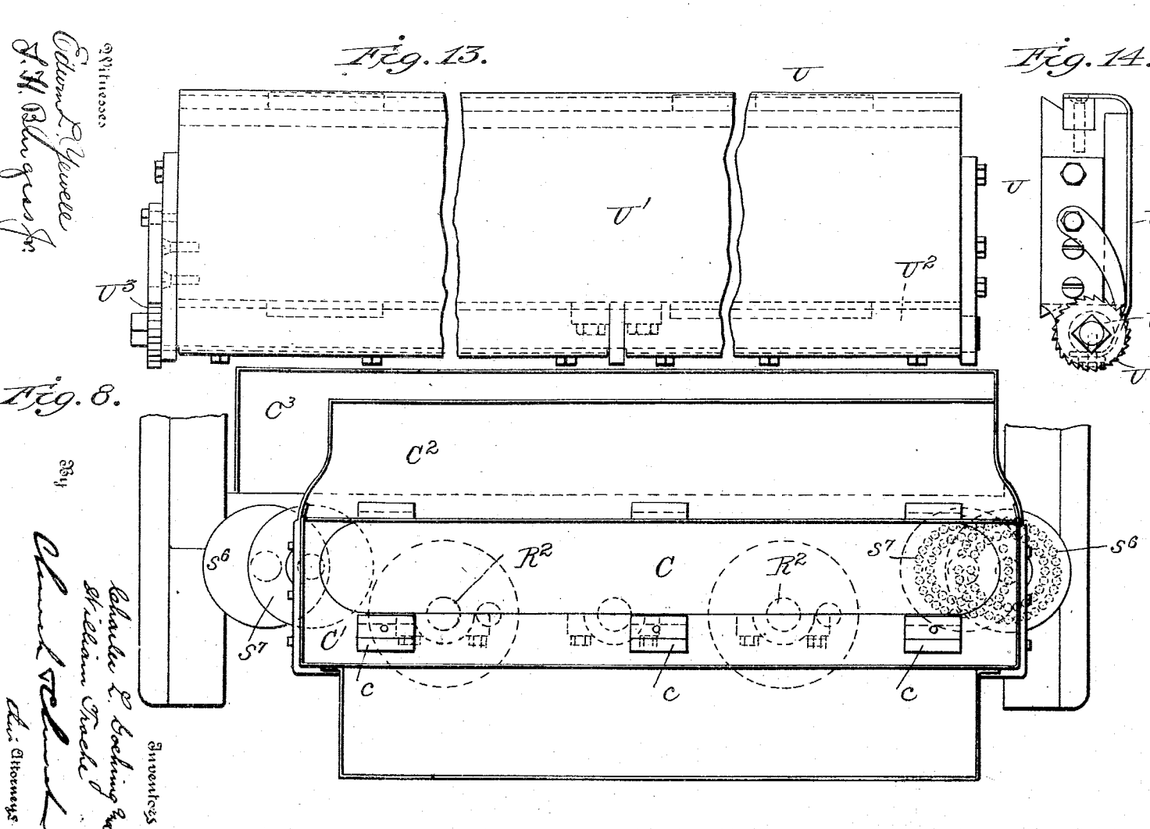
Figure 9:
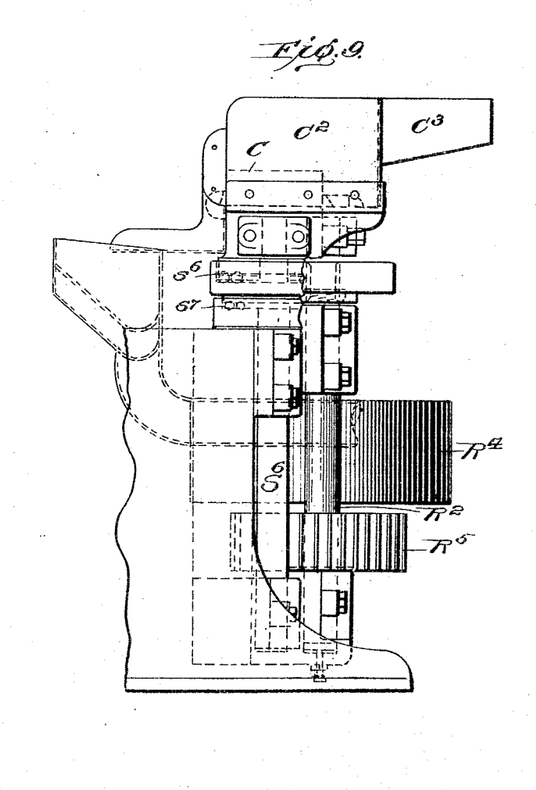

In Fig. 7 the arrangement of driving mechanism is similar to the arrangement in Fig. 4; but instead of the grinder being supported by plane flat bearing-surfaces it is supported on crank-shafts $S^6$, arranged at each end and having enlarged ball-bearings $s^6$ $s^7$ at the upper ends for supporting the grinder and maintaining the parallelism of the same. Figs. 8 and 9 are a top plan and an end elevation of the mechanism illustrated in Fig. 7, Fig. 8 showing the arrangement of the ball-bearing supports $s^6$ $s^7$ at each end of the grinder.

Figure 10:
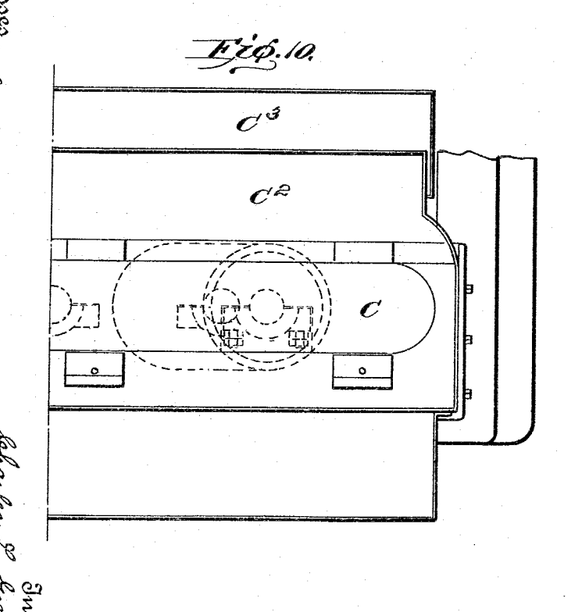
Figure 11:
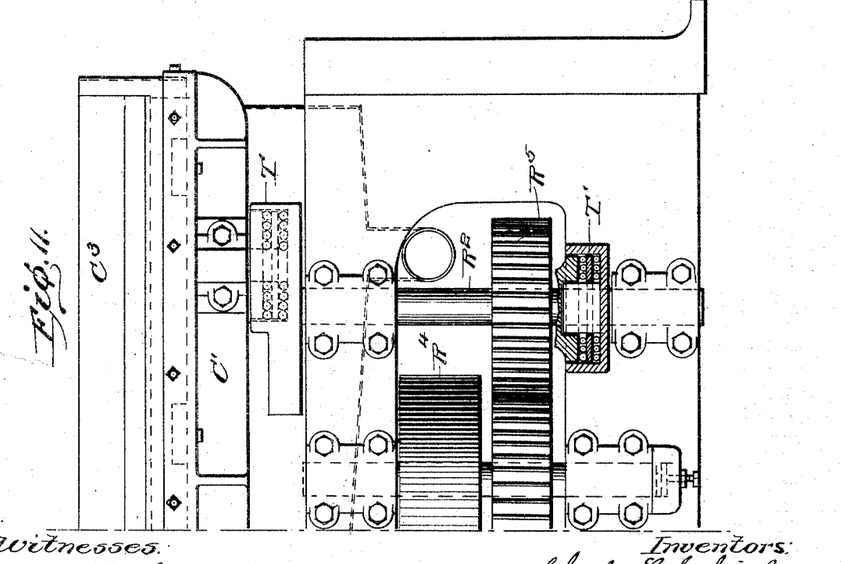
Figure 12:
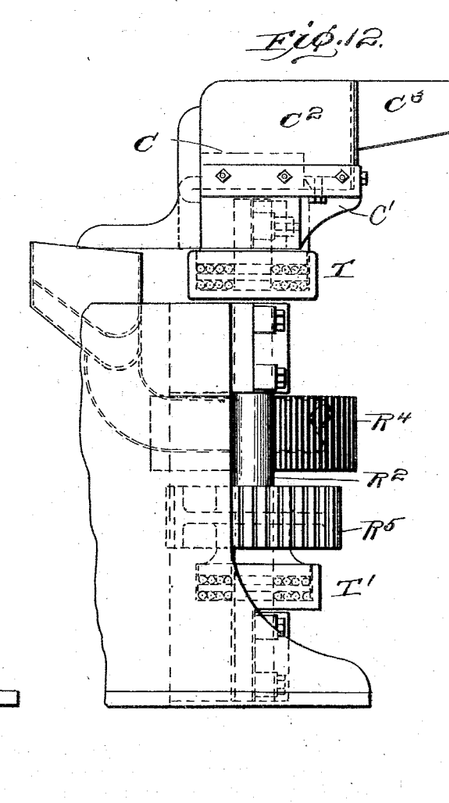

Figs. 10, 11, and 12 illustrate an arrangement corresponding to that shown in Fig. 4, save that in this instance the shaft $R^2$ in addition to driving the grinder-frame C' also serves as the supporting means therefor, said shafts $R^2$ at their upper ends being provided with enlarged ball-bearing cranks T and at their lower ends with ball-bearing thrust-bearings T', this arrangement where the shafts $R^2$ are drive-shafts requiring the employment of but two shafts in order to both support and drive the grinder.

The grinder itself may be of any suitable material commonly used in glass-working. Thus it may be of metal, wood, or other material adapted to carry the abrasive for acting on the glass, and by being made removable different grinders may be substituted one for the other in the various operations necessary to reduce and finish the surface of the glass. As a substitute for the wood, which is ordinarily employed for carrying the abrasive in that step of the process known as "white-wheeling," it is preferred in the present machine to employ a grinder having a surface of rawhide. In Figs. 13 and 14 a construction of grinder is illustrated wherein the grinder-body U has a sheet of rawhide U' stretched tightly over its surface. This sheet of rawhide is preferably attached at one edge to one edge of the grinder-body and at the other edge said sheet of rawhide is attached to a roller U², journaled in end bearings in the grinder-body and adapted to be rotated by a wrench applied to one end and to be held in its position of adjustment by a ratchet-wheel and pawl U³, so as to maintain the tension on the rawhide grinding-surface. Obviously a pad of elastic material may be interposed between the rawhide and body of the grinder in order to insure a sufficient elasticity, and in the final grinding or polishing operation any other material may be substituted for the rawhide which will constitute an efficient carrier for the abrasive material, such as pumice or rouge.

In operation the vertical height of the shaft D' and parts supported thereon is adjusted for the particular grinder employed, such adjustments being facilitated by graduations $w$ and pointer W, Fig. 2, and the attendant after raising the glass holding and clamping mechanism to the position indicated in Fig. 1 puts the glass in position with its forward edge against stops G and then by manipulating the shaft K⁴ clamps the glass firmly down on the bed or table F and raises the gages G by a proper manipulation of the rod H. Then grasping the handle or lever Q he lowers the rear edge of the glass down until it rests on the grinder. Further attention on his part is not required, inasmuch as the machine will continue its operations until the arms D⁶ come to rest against the stops or cams P, when the desired amount of material will have been removed from the glass and the attendant may then raise the glass from the grinder and remove it from the machine or he may substitute other grinders for continuing the various other steps in the operation of reducing and finishing the glass known as "smooth-stoning," "white-wheeling," and "rouging" or "buffing." If desired, however, these various steps may be performed on separate machines.

Having thus described my invention, what I claim as new, and desire to be secured by Letters Patent, is—

1. In a glass-grinding machine, the combination with means for supporting and holding the glass, of a grinder having a plane grinding-face on the upper side and mechanism for imparting to said grinder a bodily circulatory movement in a plane parallel with its grinding-face; substantially as described.

2. In a machine for grinding glass plates, the combination with glass supporting and holding mechanism movable to bring the glass into proper juxtaposition to a grinder, of a grinder having an elongated plane grinding-face on the upper side, means for movably supporting the grinder to move in a plane parallel with its grinding-face and driving mechanism for imparting a bodily circulatory movement to the grinder; substantially as described.

3. In a machine for grinding glass plates, the combination with glass supporting and holding mechanism movable to carry the glass into or out of juxtaposition to the grinder, of a grinder having a plane grinding-face on the upper side, means for supporting said grinder to move in a plane parallel with its grinding-face, driving mechanism for imparting a uniform bodily circulatory movement to the grinder and an abrasive-holder surrounding the grinder; substantially as described.

4. In glass-grinding machinery, a grinder having a plane upper grinding-face, means for guiding said grinder to move bodily in a plane parallel with its face, and driving mechanism for imparting a bodily circulatory movement to the grinder; substantially as described.

5. In glass-grinding machinery, a grinder having an elongated plane grinding-face on the upper side, supporting-guides for said grinder extending in a plane parallel with the grinding-face and driving mechanism for imparting a bodily circulatory movement to the grinder on said supporting-guides; substantially as described.

6. In glass-grinding machinery, a grinder having an elongated plane grinding-face on the upper side, movable supporting-guides for supporting said grinder to move in a single plane parallel with its grinding-face, and driving mechanism for imparting a bodily movement to the grinder in said plane; substantially as described.

7. In glass-grinding machinery, a grinder having an elongated plane grinding-face on the upper side, a plurality of guiding and supporting crank-bearings for supporting said grinder to move in a single plane parallel with its grinding-face and means for imparting a circulatory bodily movement to the grinder; substantially as described.

8. In glass-grinding machinery, a grinder having an elongated plane grinding-face on the upper side, a plurality of guiding and supporting crank-bearings having bearing-surfaces extended in a plane parallel with the face of the grinder and upon which the grinder rests to move in a plane parallel with its grinding-face; substantially as described.

9. In glass-grinding machinery, the combination with a grinder, of glass clamping and supporting mechanism embodying a frame movable to carry the glass toward and from the grinder, and having arms projecting into proximity to the grinder, a bed on which the glass is supported pivotally mounted in said arms on an axis in proximity to the grinder with means for adjusting the angular position of the bed in the frame, and a clamp adjustable with and movable toward and from the bed; substantially as described.

10. In glass-grinding machinery, the combination with a grinder, of glass clamping and supporting mechanism embodying a frame mounted to swing on an axis to move the glass toward and from the grinder, and having arms projecting into proximity to the grinder, a bed on which the glass is supported, pivotally mounted in said frame with means for adjusting the angular position of the bed in the arms on an axis in proximity to the grinder, and a clamp mounted on and movable toward and from the bed; substantially as described.

11. In glass-grinding machinery, the combination with a grinder, of glass clamping and supporting mechanism embodying a frame mounted to swing on an axis to move the glass toward and from the grinder, a bed on which the glass is supported pivotally mounted in said frame on an axis substantially coincident with the edge of the glass being ground and means for clamping the glass to the bed; substantially as described.

12. In glass-grinding machinery, the combination with a grinder, of glass clamping and supporting mechanism embodying a frame mounted to swing on a movable axis parallel with the edge of the glass to be ground, to move the glass toward and from the grinder, a bed and clamping mechanism for the glass angularly adjustable in unison in said frame and means for adjusting the vertical position of the axis of the frame; substantially as described.

13. In glass-grinding machinery, the combination with a grinder, of glass clamping and supporting mechanism embodying a frame mounted to swing on a movable axis parallel with the edge of the glass to be ground, means for adjusting the position of the axis, a bed for the glass pivotally mounted in the frame on an axis in proximity to the edge to be ground and clamping mechanism for clamping the glass to the bed; substantially as described.

14. In glass-grinding machinery, the combination with a grinder, of glass clamping and supporting mechanism embodying a frame mounted to swing on a movable axis, means for adjusting the position of said axis, a bed for the glass pivotally mounted in the frame, means for adjusting the angular position of the bed in the frame, and clamping mechanism angularly adjustable with said bed; substantially as described.

15. In glass-grinding machinery, the combination with a grinder, of glass clamping and supporting mechanism embodying a frame mounted to swing on an axis to move the glass toward and from the grinder, a stop for limiting the angular movement of the frame toward the grinder, a bed for the glass angularly adjustable in said frame, means for clamping the glass to the bed and means for adjusting the axis of the frame without varying the range of its angular movement toward the grinder; substantially as described.

16. In glass-grinding machinery, the combination with a grinder of glass clamping and supporting mechanism embodying a frame mounted to swing on an axis to move the glass toward and from the grinder, an adjustable stop for limiting the angular movement of the frame toward the grinder, a bed for the glass angularly adjustable in said frame, and means for clamping the glass to the bed; substantially as described.

17. In glass-grinding machinery, the combination with a grinder, of glass clamping and supporting mechanism embodying a frame mounted to swing on an adjustable axis to move the glass toward and from the grinder, an adjustable stop for limiting the angular movement of the frame toward the grinder, adjusting mechanism for the axis of the grinder, a bed for the glass angularly adjustable in the frame and means for clamping the glass to the bed; substantially as described.

18. In glass-grinding machinery the combination with a grinder, of glass clamping and supporting mechanism embodying a frame mounted to swing on an axis to move the glass toward and from the grinder, an adjustable stop for limiting the angular movement of the frame toward the grinder, a graduated scale to indicate the adjustment of the stop, a bed for the glass angularly adjustable in the frame, means for adjusting the angular position of the bed in the frame and a graduated scale for indicating the angular position of the bed with relation to the frame; substantially as described.

19. In glass-grinding machinery, the combination with the grinder, of glass clamping and supporting mechanism embodying a frame mounted to swing on an axis to move the glass toward and from the grinder, an adjustable stop for limiting the angular movement of the frame to determine the depth of the bevel, a bed for the glass angularly adjustable in the frame on an axis substantially coincident with the edge of the glass, means for adjusting the angular position of the bed in the frame to determine the width of the bevel and correlated graduated scales for indicating the position of the stop and bed; substantially as described.

20. In glass-grinding machinery, the combination with the grinder, of glass clamping and holding mechanism embodying a frame, having arms extending rearwardly at the ends of the grinder and pivoted to swing vertically, a bed for the glass having rearwardly-projecting arms pivotally connected with the arms of the frame, adjusting mechanism between the bed and frame for varying their angular position with relation to each other and clamping mechanism mounted on the bed; substantially as described.

21. In glass-grinding machinery, the combination with the grinder, of the pivoted frame, the glass-bed mounted in said frame, adjusting mechanism for the axis of the frame, a stop-arm on the frame having a face radial to said axis and a stop with which said surface contacts, whereby the range of angular movement of the frame is not varied by the adjustment of its axis; substantially as described.

22. In glass-grinding machinery, the combination with the grinder, of the pivoted frame having rearwardly and downwardly projecting arms, the latter having stop-faces radial to the axis of the frame, the glass-bed pivoted in the rearwardly-projecting arms with means for adjusting the angular position of the bed in the frame, and adjustable stops with which the radial faces on the downwardly-projecting arms contact to limit the angular movement of the frame and bed toward the grinder; substantially as described.

23. In a glass-grinding machine, the combination with the grinder, of glass clamping and holding mechanism embodying an angularly-adjustable bed for the glass, a clamp-support adjustably mounted on the bed, an evener carried by said support and a plurality of clamps mounted on said evener; substantially as described.

24. In a glass-grinding machine, the combination with the grinder, of glass clamping and holding mechanism embodying an angularly-adjustable bed for the glass, an arch carried by the bed, a clamp-supporting slide adjustably mounted in the arch, a centrally-pivoted evener-lever carried by the slide, and clamps pivotally mounted on the ends of said evener-lever; substantially as described.

25. In glass-grinding machinery, the combination with the grinder, of the angularly-adjustable bed for the glass, clamps mounted on and angularly adjustable with said bed and a gage against which the edge of the glass is positioned, movably mounted on said bed, whereby the glass may be accurately positioned with the bed in any position of angular adjustment; substantially as described.

26. In glass-grinding machinery, the combination with the grinder and the angularly-adjustable bed and clamping mechanism for the glass, of the gage-arms pivotally mounted in bearings carried by the bed and means for moving said arms into and out of operative position; substantially as described.

27. In glass-grinding machinery a grinder having an elongated plane grinding-face on the upper side, vertically-arranged shafts below the grinder, driving-gearing connecting said shafts for unitary rotation, crank-bearings on the upper ends of the shafts having wide bearing-surfaces extending in a plane parallel with the face of the grinder and coöperating bearings on the grinder; substantially as described.

CHARLES LEWIS GOEHRING.
WILLIAM TROCHE.

Witnesses:
WILLIAM P. HALL,
OSCAR J. BAKER.